United States Patent [19]
Craveri et al.

[11] 3,758,529
[45] Sept. 11, 1973

[54] ANTIBIOTIC THERMOZYMOCIDIN AND A PROCESS FOR ITS PREPARATION

[75] Inventors: Renato Craveri, Milan; Pier Luigi Manachini, Cologno Monzese, Milan; Fabrizio Aragozzini, Milan, all of Italy

[73] Assignee: Societa Italiana Resive S.I.R. S.p.A., Milan, Italy

[22] Filed: Mar. 15, 1972

[21] Appl. No.: 234,744

[30] Foreign Application Priority Data
Mar. 23, 1971   Italy .............................. 22111 A/71

[52] U.S. Cl. .................... 260/404, 195/80, 424/319
[51] Int. Cl. ............................................. C08h 17/36
[58] Field of Search .................................... 260/404

Primary Examiner—Lewis Gotts
Assistant Examiner—Ethel G. Love
Attorney—Richard C. Sughrue, J. Frank Osha et al.

[57] ABSTRACT

A process for the manufacture of the antibiotic thermozymocidin which comprises the steps of cultivating the micro-organism belonging to the thermophilic eumycetes group and designated as ATCC No. 20349 in an aqueous nutrient medium containing a source of organic carbon and a source of organic or inorganic nitrogen, at a temperature of about 40°C, at a pH of from 6.5 to 7.5 and under submerged aerobic conditions and with agitation until a substantial antibiotic activity is imparted to the said medium, and isolating said thermozymocidin from the fermentation broth, is disclosed.

1 Claim, 1 Drawing Figure

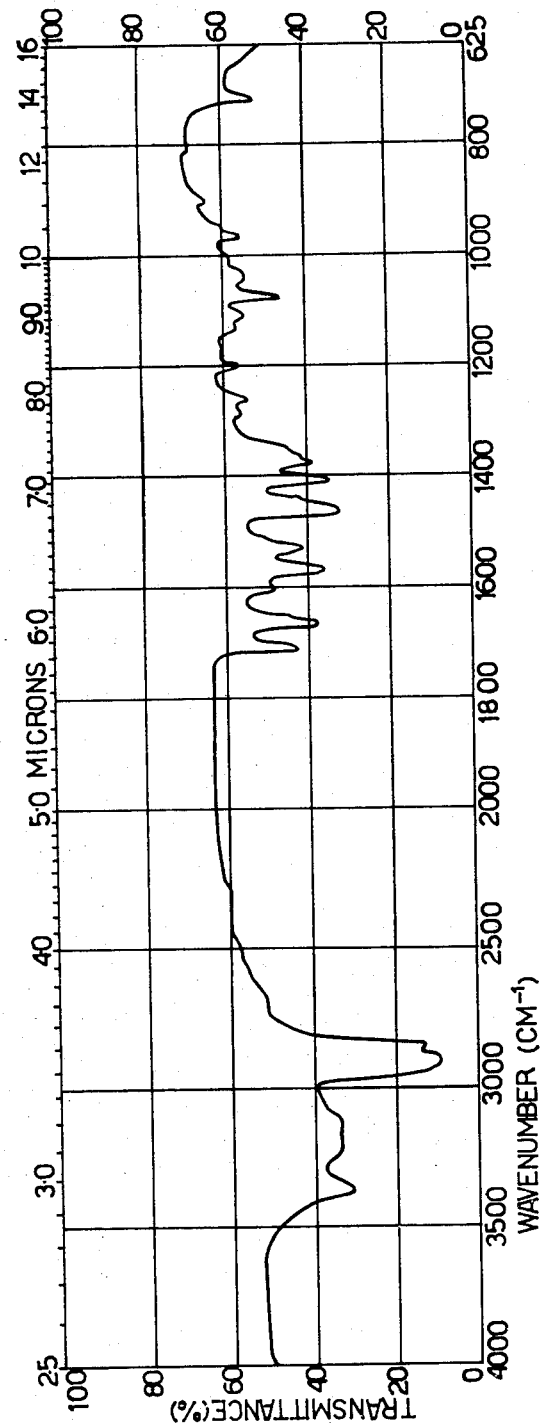

ANTIBIOTIC THERMOZYMOCIDIN AND A PROCESS FOR ITS PREPARATION

BACKGROUND OF THE INVENTION

Field of the Invention

The present invention relates to a new antibiotic and to its derivatives, noted for high activity vis-a-vis microorganisms of the yeast and mold type. This invention also relates to the manufacture of such an antibiotic using a fermentation process, and the method of concentrating, purifying and isolating the antibiotic from the products of fermentation.

In the ensuing description, the new antibiotic is referred to as thermozymocidin. Its proposed chemical name is 2-amino-2-hydroxymethyl-3,4-dihydroxy-14-oxo-eicos-trans-6-enoic acid and its structure is

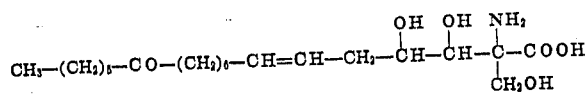

SUMMARY OF THE INVENTION

According to the present invention, thermozymocidin is produced by cultivation under controlled conditions of a micro-organism belonging to the thermophilic eumycetes group. Such stock has been isolated from a sample of maize-cultivated soil taken from the province of Milan, Italy. The stock is deposited in the collection of the Institute of Vegetable Pathology of the University of Milan under No. I.P.V. F–433 and the American Type Culture Collection (ATCC) under ATCC No. 20349.

DETAILED DESCRIPTION OF THE INVENTION

For isolation of the thermophilic eumycetes stock useful for the purposes of the present invention, a suspension of the soil sample was incubated at 45° to 50° C prior to incorporation into a potato agar-glucose-yeast extract, comprising: 20 g agar, 20 g glucose, 2 g yeast extract per liter of potato used; the potato infusion is prepared from 200 g of potato pulp in distilled water. The culture medium is adjusted to a pH of 6.8 and sterilized at a temperature of 121° C for 20 minutes.

After two to four days' incubation at 45° to 50° C, colonies of thermophilic eumycetes I.P.V. F–433 (ATCC No. 20349) were isolated and transplanted onto the potato agar-glucose-yeast extract. On this medium, after 4 to 6 days, the micro-organism exhibits a minimum development temperature of approximately 26° C, a maximum temperature of 50° to 55° C, the optimum temperatures being around 43° C.

The stock of thermophilic eumycetes I.P.V. F–433 (ATCC No. 20349) normally forms in the solid culture media used (Table 1) colonies of a velvety, slightly cotton-like appearance, consisting of a mycelium of initially translucent substrate, which acquires a yellow-cream color, and a whitish aerial mycelium.

There may be an exopigment of slightly yellow color which is not readily diffusable into the medium.

TABLE 1

Degree of growth on various agarized culture media after six days' incubation at 43° C, with the stock I.P.V. F–433 (ATCC No. 20349)

| Medium | Growth |
|---|---|
| Malt | Good |
| Milk | Moderate |
| Potato-glucose-yeast extract | Good |
| Glucose-yeast extract | Moderate |
| Starch-yeast extract | Good |
| Ordinary | Poor |
| Ordinary-yeast extract | Poor |
| Ordinary, with glucose | Moderate |
| Soya | Moderate |
| Oats | Poor |
| Rice infusion | Good |
| Stable manure infusion | Moderate |
| Asparagine-glycerine | Moderate |
| Czapek's | Very poor |

The mycelium of the stock of thermophilic eumycetes I.P.V. F–433 (ATCC No. 20349) is constituted by branched septate hyphae varying in diameter from 2 to 12 microns, the disposition of which may give rise to dactyloid formations, coiling and aggregation of hyphae, with a particularly sclerotic trend.

Typically conidial or sexual phases have not as yet been observed and reproduction usually occurs by fragments or conglomerates of hyphae, which is why the stock is provisionally ascribed to the "mycelia sterilia" group.

The thermozymocidin producing stock also has the following physiological characteristics:
Oxygen requirement: Aerobic.
pH requirement: Good growth at a pH of from 5.5 to 8.
Proteolytic activity: Positive.
Presamic activity: Positive.
Amylolytic activity: Positive.
Lipolytic activity: Positive.
Cellulosolytic activity: Weakly positive.
Ribonucleasic activity: Positive.
Utilization of carbon sources: Positive for glucose, fructose, galactose, xylose, maltose, lactose, saccharose, dextrin, starch, inulin, glycerine and manitol.
Utilization of nitrogen sources: Good for peptones, asparagine, urea and potassium nitrate, poor for ammonium sulfate.

As an antibiotic, thermozymocidin has a decidedly antifungal spectrum of activity.

In concentrations of 0.1 to 10 γ/ml (method of successive dilutions in agar malt at 28° C), various species of yeasts of the following types are inhibited: Saccharomyces, Pichia, Hansenula, Debaryomyces, Endomycopsis, Schizosaccharomyces, Kloeckera, Rhodotorula, Torulopsis, Candida, Trichosporon, and Cryptococcus.

Of particular interest is the activity inhibited by thermozymocidin vis-a-vis *Cryptococcus neoformans*, an agent of some forms of mycosis. This micro-organism is sensitive to concentrations of 0.05 to 0.1 γ/ml.

In concentrations of 5 to 50 γ/ml, moreover, various species of filamentous eumycetes of the types: Penicillium, Aspergillus, Fusarium, Alternaria, Botrytis, Cercospora, Helminthosporium, Oidium, Mucor, Neurospora, Trichophyton, and Microsporum are also inhibited.

Concentrations equal to 50 γ/ml of thermozymocidin do not inhibit the following Gram positive bacteria: *Bacillus subtilis, Bacillus cereus, Bacillus thuringiensis, Bacillus anthracis, Micrococcus flavus, Micrococcus lysodeikticus, Staphylococcus aureus, Streptococcus fae-* calis, Sarcina lutea, Diplococcus pneumoniae, Lactobacillus casei, Corynebacterium aqui, and Corynebacterium diphtheriae.

Likewise, concentrations equal to 50 γ/ml of thermozymocidin do not inhibit the following Gram negative bacteria: *Salmonella typhimurium, Salmonella paratyphi, Serratia marcescens, Proteus vulgaris, Pseudomonas aeruginosa, Aerobacter aerogenes, Escherichia coli, Klebsiella pneumoniae, Alcaligenes faecalis, Shigella dysenteriae,* and *Brucella abortus,* nor the following acid-resistant bacteria: *Mycobacterium butyricum, Mycobacterium smegmatis, Mycobacterium tuberculosis,* and *Mycobacterium phlei,* nor the following actinomycetes: *Nocardia blackwellii, Nocardia opaca, Streptomyces griseus, Streptosporangium album,* and *Walksmania rosea.*

According to the process of the present invention, the thermozymocidin producing stock is cultivated in a suitable aqueous nutrient medium at temperatures around 40° C and at a pH of from 6.5 to 7.5, under aerobic conditions, submerged, and with agitation.

The standard cultural medium contains a carbon source such as: starch, dextrin, maltose, glucose, lactose and glycerine, and a suitable source of organic nitrogen such as proteins or their lysates, or inorganic nitrogen.

Also, mineral salts, such as for example potassium phosphate and magnesium sulfate, may be added, as well as silicone or another antifoaming agent.

After the growth necessary to impart the antibiotic properties to the medium is attained (normally achieved in approximately 3 days), the thermozymocidin is isolated from the fermentation broth.

For this purpose, the cultural broth is subjected to centrifugal treatment or filtration and the mycelium is extracted with methanol or acetone, while the liquid portion is treated with an ion-exchange resin, a weak acid or base, or extracted with a mixture of solvents.

The crude active fractions are purified by chromatography on silica gel, and then crystallization from pure organic solvents or mixtures thereof ensues.

Thermozymocidin takes the form of a white powder with the following characteristics:

Melting point: 168° to 170° C (with decomposition).
Rotatory power: $[\alpha]^{25}_d = +40 \pm 8$ (C = 0.12 pyridine)
Ultraviolet spectrum maximum $m$ microns: 206 (methanol) to absorption.
Infrared absorption spectrum maximum $cm^{-1}$: 3375, 3180, 1710, 1665, 1605, 1570 (Nujol).
Elementary analyses: Carbon 62.64 percent, hydrogen 10.38 percent, nitrogen 3.48 percent. For an empirical formula $C_{21}H_{39}NO_6$, the theoretical quantities for carbon, hydrogen and nitrogen are respectively 62.81 percent, 9.79 percent, 3.39 percent.

Positive reactions: Ninhydrin (disappeared due to reactivity after acetylation), dinitrophenylhydrazine, periodate.

Negative reactions: Folin, biuret, Sakaguchi, anthrone, naphthoresorcin, triphenyltetrazole, and silver nitrate.

The nuclear magnetic resonance spectrum (NMR) performed in deuterochloroform on a polyacetate obtained with acetic anhydride in pyridine demonstrated the following signals: 2.02 (S,3); 2.05 (S,3); 2.1 (S,3); 4.53 (S,2); 4.75 (m,1); 505 (m,3); 5.8 (d,2); 6.12 (m,1) ppm, in addition to complex signals equivalent to 24 protons, ranging from 0.8 to 2.6 ppm.

Solubility levels: Thermozymocidin is insoluble in petroleum ether, ethyl ether and benzene; it is substantially insoluble in ethyl acetate, isoamyl acetate, acetone and water; not readily soluble (0.05 to 0.2 percent) in dimethylformamide, chloroform, pyridine, methanol, ethanol and n-butanol; soluble in dimethylsulfoxide (approximately 0.4 percent), 0.1 N aqueous sodium hydroxide (approximately 1 percent), acetic acid, and soluble in hot 2 N hydrochloric acid.

The attached FIGURE shows the infrared spectrum.

Thermozymocidin has considerable stability. The antibiotic titre remains constant after 2 days in aqueous alcohol solutions having a pH ranging from 2 to 10, at 50° C.

Alcohol solutions prove to be stable after 1 month at 4° C. The antibiotic is not rendered inactive by bovine serum.

The (acute) toxicity of aqueous preparations of thermozymocidin was determined in the albino mouse by injection via the intraperitoneal route; the LD proved to be 5 mg/kg, the $LD_{50}$ approximately 8 mg/kg. By way of illustration, though not limitative of the present invention, an example of the fermentation and extraction of thermozymocidin will now be illustrated.

EXAMPLE 1

From two slants of 2 to 3 days on a potato agar-glucose-yeast extract, washed with 5 to 10 ml of physiological saline solution, a suspension is prepared of the producer stock which is to be inoculated in a 750 ml beuta containing 100 ml of a culture medium made up as follows:

| | |
|---|---|
| Maize flour | 30 g |
| $K_2HPO_4$ | 3 g |
| $MgSO_4 \cdot 7H_2O$ | 0.5 g |
| Spring water | to make up to 1,000 ml |

This medium is brought to a pH of 7 and sterilized at 121° C for 30 minutes; after cooling to 40° C and inoculation, it is placed for 36 to 48 hours in linear agitation at 120 cpm (stroke 8 cm), the temperature being thermostatically controlled to 40° to 43° C. The broth culture obtained from three to five such samples is used to inoculate a 10-liter fermenting vessel containing 5 liters of the medium described above. After 48 hours' culture at 40° C with agitation at 400 r.p.m. and aeration equal to 0.5 liter/liter/minute, the broth culture from this fermenting vessel is used to inoculate, at the rate of 5 percent, 20-liter fermenting vessels containing 12 liters of the above-described medium. The conditions of fermentation to produce thermozymocidin are: temperature, 40° C, agitation 500 r.p.m., and aeration 0.6 to 0.8 liter/liter/minute. A silicone emulsion (Dow Corning commercial product, Antifoam FG-10) is also used as an antifoaming agent. After approximately 80 hours of fermentation, when the highest concentration of antibiotic is reached (equal to approximately 80 mg/l of broth culture), fermentation is discontinued.

During the course of fermentation, the pH does not show substantial fluctuations and the final value is equal to 6.8 to 7.2.

EXAMPLE 2

Fifty liters of the broth culture obtained in Example 1 are subjected to centrifugal treatment. The mycelium is extracted twice with 2 liters of acetone, stirring for 4 hours at ambient temperature. The acetone extracts are poured into the surface layer (supernatant) originating from the centrifugal processing of the broth culture.

The light precipitate formed is removed by filtration over celite and the filtrate is passed over a column containing 3 kg of a weak acid resin (Amberlite IRC–50, acid form) at the rate of 4 liters/hour.

In this way, adsorption of the antibiotic takes place with yields in excess of 90 percent.

The column is then washed with 6 liters of distilled water after which elution commences, first with 10 liters of 1 N ammonia, from which the first 5 to 6 liters are separated, and then with 5 liters of a mixture of 1 N ammonia-methanol in a volumetric ratio of 1:1.

The combined active fractions are concentrated by evaporation at below ambient pressure and at a temperature equal to approximately 80° C in order to reduce the volume to 3 liters. The concentrated fraction is then extracted twice with 1 liter of n-butanol. The combined butanol extracts are converted to dryness through evaporation at below ambient pressure and at a temperature of approximately 80° C. In this way, 15 to 16 g of crude antibiotic are obtained, which is then treated three times with 150 ml of ethyl acetate. The inactive soluble fraction is separated. The yellowish-white active product (approximately 2.2 g) is chromatographed on silica gel, the eluent used being a mixture of isoamyl acetate, methanol, formic acid and water in a volumetric ratio of 65:25:5:5. The antibiotic in analytical purity (1.5 g) is obtained by crystallization with chloroform-ethanol.

Although the foregoing adequately describes the invention disclosed, it is readily apparent that various changes and modifications can be made without departing from the spirit and scope thereof.

What is claimed is:

1. A compound of the formula:

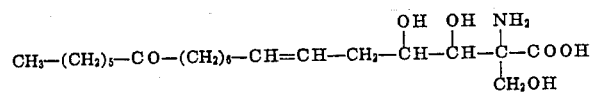

* * * * *